(12) United States Patent
Cordourier Maruri et al.

(10) Patent No.: US 11,641,544 B2
(45) Date of Patent: May 2, 2023

(54) LIGHTWEIGHT FULL 360 AUDIO SOURCE LOCATION DETECTION WITH TWO MICROPHONES

(71) Applicant: INTEL CORPORATION, Santa Clara, CA (US)

(72) Inventors: Hector A. Cordourier Maruri, Guadalajara (MX); Jose R. Camacho Perez, Guadalajara Jalisco JAL (MX); Paulo Lopez Meyer, Zapopan (MX); Julio C. Zamora Esquivel, Zapopan (MX); Alejandro Ibarra Von Borstel, Zapopan (MX)

(73) Assignee: INTEL CORPORATION, Santa Clara, CA (US)

( * ) Notice: Subject to any disclaimer, the term of this patent is extended or adjusted under 35 U.S.C. 154(b) by 650 days.

(21) Appl. No.: 16/689,584

(22) Filed: Nov. 20, 2019

(65) Prior Publication Data

US 2020/0092643 A1   Mar. 19, 2020

(51) Int. Cl.
*H04R 3/00* (2006.01)
*H04R 1/40* (2006.01)
*H04R 29/00* (2006.01)
*H04R 3/04* (2006.01)
*G06N 3/04* (2023.01)

(52) U.S. Cl.
CPC .............. *H04R 3/005* (2013.01); *G06N 3/04* (2013.01); *H04R 1/406* (2013.01); *H04R 3/04* (2013.01); *H04R 29/005* (2013.01); *H04R 2201/401* (2013.01)

(58) Field of Classification Search
CPC .......... H04R 3/005; H04R 1/406; H04R 3/04; H04R 29/005; H04R 2201/401; G06N 3/04
USPC ........................................................... 381/92
See application file for complete search history.

(56) References Cited

U.S. PATENT DOCUMENTS 9,820,036 B1 *  11/2017  Tritschler ............ G10L 21/0208

* cited by examiner

*Primary Examiner* — Paul Kim
(74) *Attorney, Agent, or Firm* — Hanley, Flight and Zimmerman, LLC (57) ABSTRACT

A system is described herein. The system includes at least one hardware processor that is configured to identify a pre-determined acoustic barrier filter, wherein the acoustic barrier filter coincides with the physical acoustic barrier and receive an audio signal within a time window at the first microphone and the second microphone. The hardware processor is also configured to calculate a first measure of variability, a second measure of variability, a third measure of variability, and a fourth measure of variability. The hardware processor further concatenates the first measure of variability, the second measure of variability, the third measure of variability, and the fourth measure of variability to form a feature vector, and inputs the feature vector into a location classifier to obtain an audio source location.

25 Claims, 9 Drawing Sheets

FIG. 9

LIGHTWEIGHT FULL 360 AUDIO SOURCE LOCATION DETECTION WITH TWO MICROPHONES

BACKGROUND ART

Determining a spatial location of an audio source has many applications. For example, in a smart environment or an intelligent transportation device, knowledge of the location of an audio source is the foundation of determining if the sound comes from an intended user, from some interference, or from some additional source that can be used for context awareness. The determination of the spatial location of the audio source also enables the use of audio enhancement techniques on the selected audio source for automatic speech recognition (ASR), speaker identification, audio event detection, or even collision avoidance. Typically, real-time audio location requires multiple microphone arrays or sophisticated signal processing and machine learning techniques.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Traditionally, high-quality, real-time audio location determination requires multiple microphone arrays or sophisticated signal processing and machine learning techniques. Multiple microphone arrays require additional power. Additionally, sophisticated signal processing and machine learning techniques consume additional power when processing the audio signals. Moreover, including the additional hardware and software to realize audio source location detection can increase an overall cost of a device.

The present techniques enable a determination of an audio source location with two microphones. The audio source location may be determined in a full 360° degrees surrounding the two microphones. In particular, the present techniques include identifying a pre-determined acoustic barrier filter, wherein the acoustic barrier filter coincides with the physical acoustic barrier and receiving an audio signal within a time window at the first microphone and the second microphone. A first measure of variability, a second measure of variability, a third measure of variability, and a fourth measure of variability may be calculated based on the received audio signals. The first measure of variability, the second measure of variability, the third measure of variability, and the fourth measure of variability are concatenated to form a feature vector. The feature vector is input to a location classifier to obtain an audio source location. Thus, the present techniques enable detecting the spatial location of a sound source captured by a two-microphone array, with very low computer overhead.

In embodiments, the present techniques mimic the way human ears detect sound source location using only a pair of "sensors," wherein the two microphones mimic the functionality of human ears. In particular, the present techniques enable the detection of a 360° angle of arrival using only a pair of microphones installed in a device (laptop, smart speaker, infotainment center, autonomous vehicle, etc.), and an acoustic barrier. The measure of variability may be a Root Mean Square (RMS) value. In embodiments, the RMS value of a difference of unfiltered and filtered microphone signals may be used as a descriptor feature, and machine learning may take as input the descriptor and estimate the location of the sound source based on the descriptor. In embodiments, the machine learning technique used herein is a shallow neural network (NN) implemented as a location estimator.

In embodiments, the location of the sound source may be an angle of arrival that is estimated or determined according to the present techniques. The present techniques may be implemented via low cost hardware with a low computer overhead, simultaneously. In this manner, the present techniques do not require a tradeoff between hardware and software, as each component is low cost and consumes a low overhead. In particular, the present techniques are enabled using two microphones (as, for example, most laptops already have), a small acoustic barrier (that can be already a part of the form factor), and a very lightweight algorithm (does not require the computation of FFT or other types of complex signal processing routines). The present techniques do not require digital signal processing (DSP) modules or dedicated hardware acceleration. Similar to human hearing, the present techniques can detect full 360° source location. Moreover, the present techniques are not affected by a situation in which each microphone has a slightly different gain.

Figure 1:
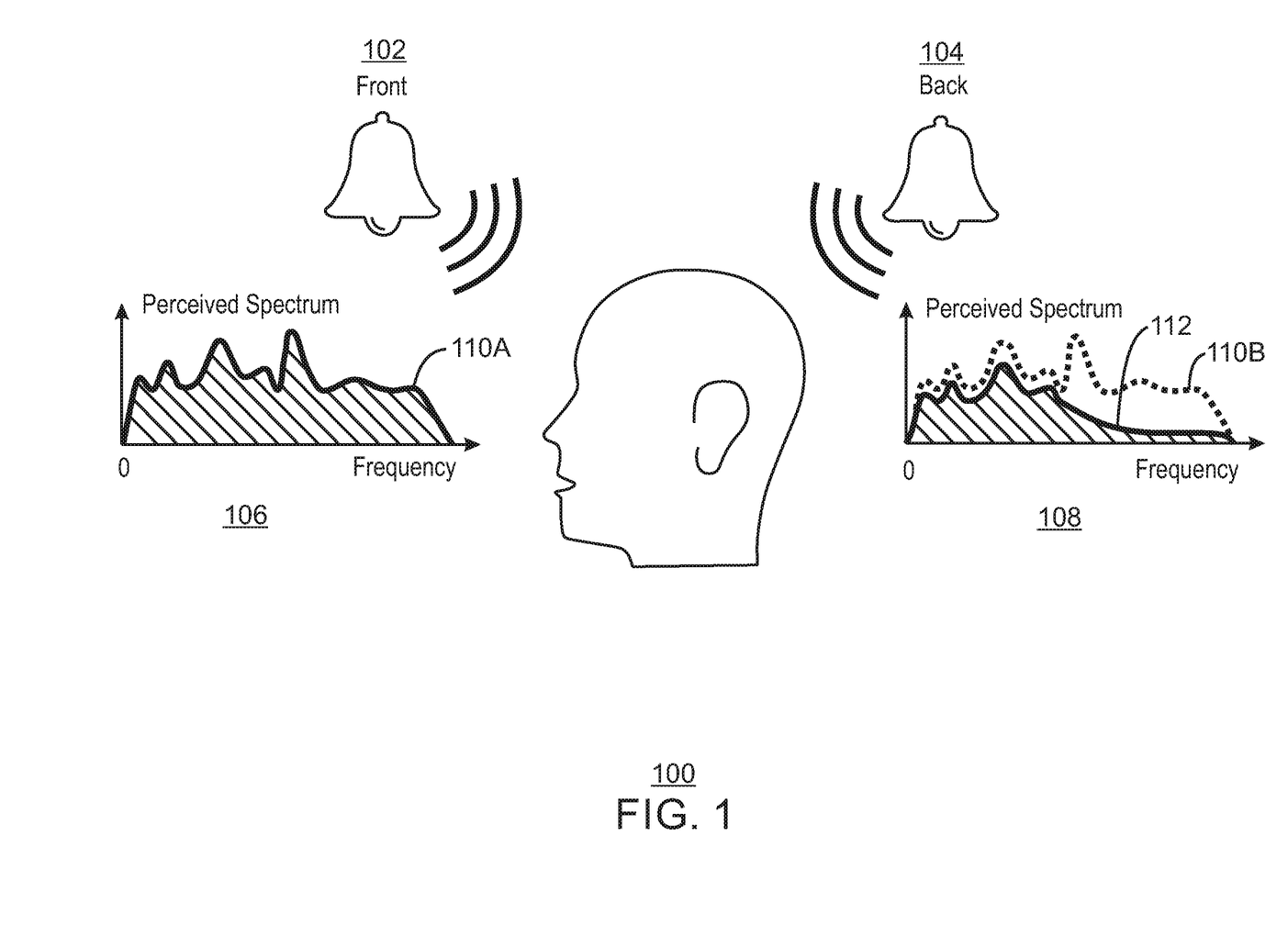
FIG. 1 is an illustration of amplitude and frequency content differences as heard by a human.

FIG. 1 is an illustration of amplitude and frequency content differences as heard by a human 100. As illustrated, a sound source 102 may be positioned substantially in front of the human 100. A sound source 104 may be positioned substantially behind the human 100. As used here in, substantially in front of human 100 may refer to a position that is visible to the human as seen through the eyes of the human. By contrast, substantially behind the human 100 may refer to a position that is not visible to the human through the eyes of the human. In examples, audio from a sound source that is positioned substantially in front of the human will encounter different physical barriers of the human ear as sound waves travel to the human eardrum when compared to a sound source that is positioned substantially behind the human. In particular, components of the human ear may act as an acoustic barrier. For example, outer ear components serve to filter components of the audio frequency components according to the angle of arrival of the audio. In particular, the audio may be filtered differently by physical outer ear components based on the direction from which the sound arrives. This direction may indicate a location of the sound source.

Accordingly, graph 106 represents a perceived spectrum of audio content as received from the front sound source 102. The perceived spectrum is illustrated according to a frequency content of the perceived spectrum. Note that audio received from the front sound source 102 is received with a full spectrum of audio content. By contrast, the graph 106 represents a perceived spectrum of audio content as received from the back-sound source 104. The perceived spectrum is illustrated according to a frequency content of the perceived spectrum. Note that in the example of FIG. 1, the front sound source 102 and the back-sound source 104 emit the same audio content as illustrated by the perceived spectrums 110A and 110B. However, as illustrated at 112, the actual received spectrum under the solid line in graph 108 experiences increased filtering as the frequency of the audio content increases.

FIG. 1 illustrates a real-world scenario where a human brain uses a difference in frequency content to estimate a location of the sound source. As used herein, a sound source refers to an entity that emanates sound. The location of the sound source may be described as a position in space relative to an entity who hears or captures the sound, such as a human or a microphone. As illustrated in FIG. 1, humans and many other animals are able to estimate all-around sound source location using only two ears, or "sensors." This is possible because the shape of the ears and the presence of the head "filter out" some of the audio frequency content (specifically, high frequencies) in some audio directions. The brain uses this frequency content difference to correctly estimate sound location.

A determination of the location of the sound source may be used to determine if the sound comes from an intended user, from some interference, or some additional source that can be used for context awareness. Moreover, in smart home environments, office environments, or intelligent transportation devices (autonomous cars, drones, etc.), the real-time detection spatial location of audio sources can be an important feature, which can be used to determine if the audio comes from the intended user or users, from some interference, or some additional audio source that can be used for context awareness. It also enables the use of different types of audio enhancement techniques on the selected audio source for ASR, speaker ID, audio event detection or even collision avoidance.

Traditionally, high quality sound location detection is made via audio captured by microphone arrays, typically of around 4 to 8 elements, to allow proper location in all directions. The rationale behind this is to have a sensor or other audio capture device in the platform generally aimed towards any possible audio source location. This traditional technique comes with the additional cost of not only multiple microphones, but also the processing audio channels in the platform, which can take a heavy toll on computer overhead. Such implementations may also require a dedicated DSP hardware.

Figure 2:
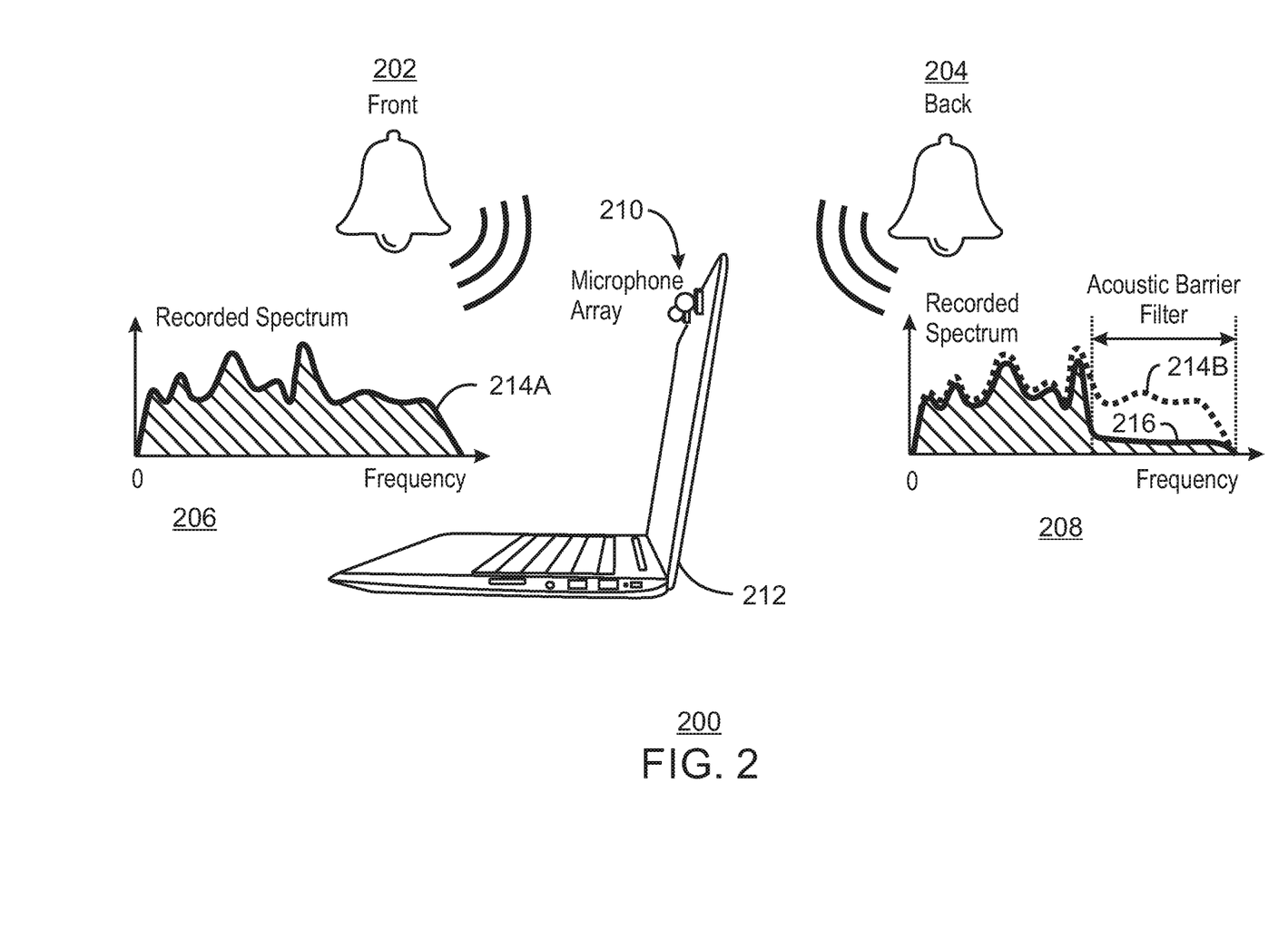
FIG. 2 is an illustration of amplitude and frequency content differences in audio as received by an electronic device.

FIG. 2 is an illustration of amplitude and frequency content differences in audio as received by an electronic device. As illustrated in FIG. 2, the electronic device 212 may be a laptop. The electronic device 212 may include a microphone array 210. The microphone array according to the present techniques includes two microphones. As illustrated, a sound source 202 may be positioned substantially in front of the laptop 212. A sound source 204 may be positioned substantially behind the laptop 212. As used herein, substantially in front of the laptop 212 may refer to a position that in front of a plane created by the lid or display screen of the laptop 212. By contrast, substantially behind the laptop 212 may refer to a position that behind the plane created by the lid or display screen of the laptop 212, wherein the speakers face the front of the plane created by the lid or display screen of the laptop 212. In examples, audio from a sound source that is positioned substantially in front of the laptop 212 will encounter different physical barriers created by the laptop when the audio travels to the microphones 210 when compared to the sound source that is positioned substantially behind the laptop 212. Accordingly, components of the laptop may at as an acoustic barrier. For example, the display and lid combination serve to filter components of the audio content received from various directions. In particular, the filter may vary based on the spatial location of the laptop. Thus, audio may be filtered differently by laptop components based on the direction from which the sound arrives. This direction may indicate a location of the sound source.

The physical acoustic barrier as described herein may be a surface that alters a frequency component of an audio signal from an audio source. Sound that encounters the acoustic barrier may be reflected off of the surface of the acoustic barrier. Additionally, sound may be absorbed by the acoustic barrier and/or transmitted through the acoustic barrier. Typically, the acoustic barrier is formed from a solid material and is wide or large enough to cause a measurable effect on the frequency content of an audio signal. The acoustic barrier has a frequency response that alters the frequency spectrum of audio signals that encounter the acoustic barrier. As used herein, audio signals will encounter the acoustic barrier when the waveforms that comprise the audio signals are reflected, transmitted, or absorbed by the acoustic barrier. In embodiments, an audio signal that encounters the acoustic barrier at a given frequency will respond to the encounter or collision with the acoustic barrier with a same change in frequency as dictated by the frequency response of the acoustic barrier. The frequency response of the acoustic barrier may be determined and used to derive a digital filter. The digital filter mimics the physical frequency response of the acoustic barrier.

The frequency response as applied to an audio signal may act as a low pass filter. In particular, when the audio signal encounters the acoustic barrier the effect on the audio signal is to pass frequencies lower than a selected cut off frequency and attenuate signals with frequencies that are higher than the cutoff frequency. The particular cut off frequency associated with the acoustic barrier is dependent upon the materials used to make the acoustic barrier, the shape of the acoustic barrier, as well as other physical attributes of the acoustic barrier. In embodiments, the acoustic barrier may be designed according to a predetermined cut off frequency that can be used to distinguish sounds that arrive from sound source is located in front of the microphone when compared to the predetermined cut off frequency of sounds that arrive from a sound source that is located behind the microphone. For example, an audio signal that must cross the acoustic barrier may experience higher filtering when compared to an audio signal that does not cross the acoustic barrier. In this example, the audio signal that must cross the acoustic barrier may experience more reflection of the audio signal and thus a reduced frequency content is available for capture by the microphones. The audio signal that does not cross the acoustic barrier may experience less reflection of the audio signal, and thus retain more frequency content for capture by the microphones.

In embodiments, the acoustic barrier may be designed such that certain phonemes are likely to be filtered based on the relative frequency of the phoneme. The relative frequency of the phoneme is the frequency of the phoneme as compared to other phonemes spoken by the same user. For example, the /s/ sound from a user may be spoken at a higher frequency relative to other portions of the same user's speech. Thus, the acoustic barrier may be designed with a corresponding cutoff frequency that filters phonemes that naturally include a higher frequency content when compared to other phonemes.

Accordingly, graph 206 represents a perceived spectrum of audio content as received from the front sound source 202. The perceived spectrum is illustrated according to a frequency content of the perceived spectrum. Note that audio received from the front sound source 202 is received with a full spectrum of audio content. By contrast, the graph 208 represents a perceived spectrum of audio content as received from the back-sound source 204. The perceived spectrum is illustrated according to a frequency content of the perceived spectrum. Note that in the example of FIG. 2, the front sound source 202 in the back-sound source 204 emit the same audio content as illustrated by the spectrums 214A and 214B. However, as illustrated at 216, the actual received spectrum under the solid line of graph 208 experiences increased filtering as the frequency of the audio content increases.

The present techniques enable a location detection routine that does not require a spectral representation or any other numeric transformation, which enables an improvement in processing overhead. In particular, the present techniques enable a full 360° location detection in rooms of different sizes and shapes, with simplified hardware (two microphone array and an acoustic barrier). In a traditional laptop with a microphone array mounted on top of the lid, the difference of frequency content between the audio captured from frontal and posterior audio sources can also be used to detect such source location, using the acoustic barrier filter.

An analogous situation can be seen in other platforms, like regular laptops, in which the couple of microphones is located in a certain orientation in which a difference of frequency content can also be used to detect such source location. For example, in a regular laptop with a two-microphone array mounted on top of the lid, the lid itself can be considered an acoustic barrier that is acoustically transparent for low frequency sounds, but acoustically opaque for high frequency sounds (analogously to the human ears). The frequency band in which the barrier is opaque can be modelled as an acoustic barrier filter, which is "produced" by the materials of the laptop lid itself. A scheme of this phenomenon can be seen in FIG. 2.

Figure 3:
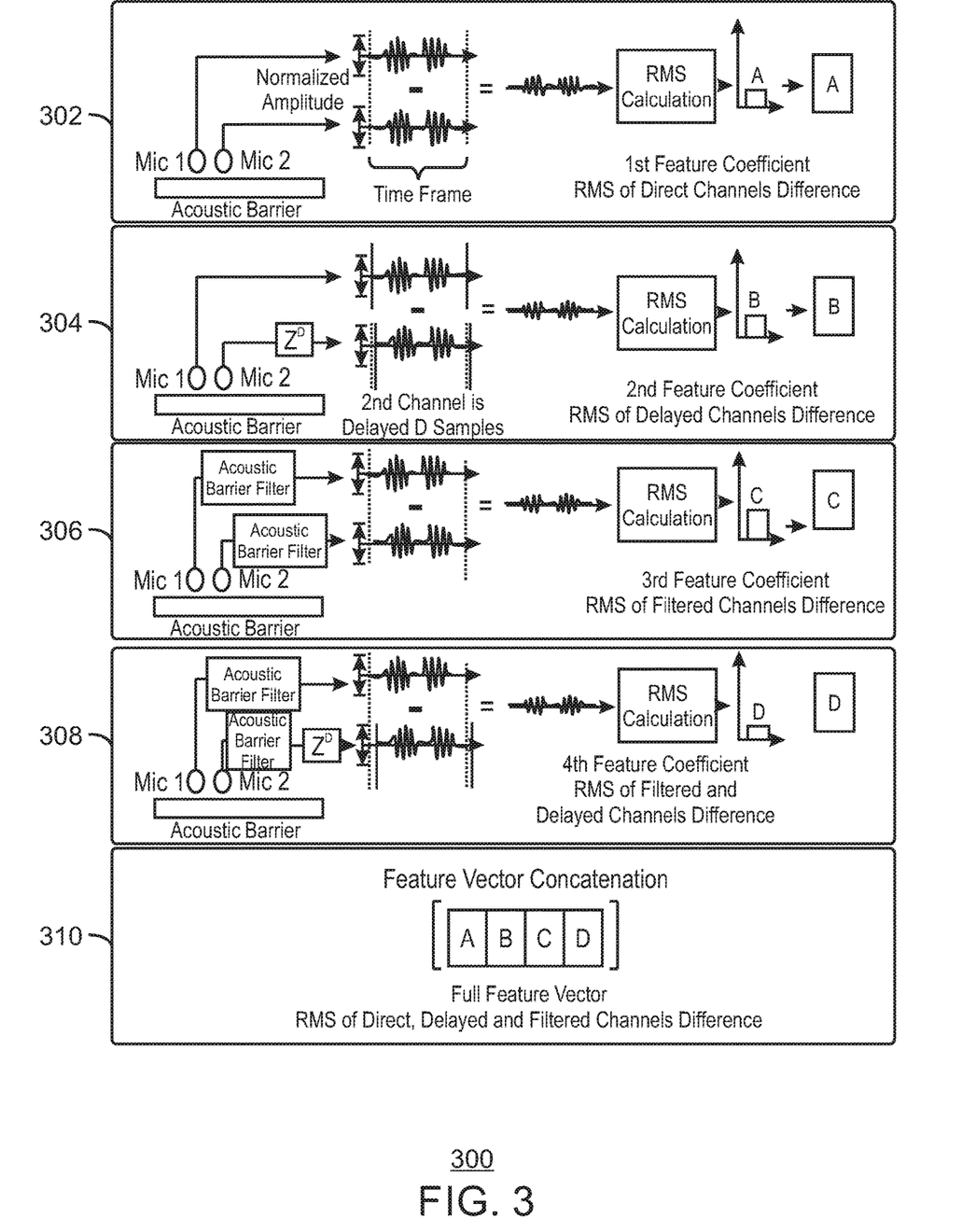
FIG. 3 is a block diagram of feature extraction according to the present techniques.

FIG. 3 is a block diagram of feature extraction 300 according to the present techniques. In FIG. 3, the feature extraction 300 is based on calculating the root mean square (RMS) of the difference of the normalized time domain signals from a microphone pair. The RMS value of a signal may represent an average power or strength associated with the signal. In embodiments, the audio signal received by a microphone according to the present techniques may be defined by a time frame or window. The time frame or window may be a period of time, of any length, where audio signals are captured. In embodiments, the same time window of signal is obtained from each microphone pair. As described herein, a first microphone of the microphone pair may be referred to as microphone 1, a second microphone of the microphone pair may be referred to as microphone 2. The descriptors as described herein may be calculated on a per-window basis for the microphone pair. As used herein, a descriptor provides a representation of the audio signal during the time window.

At block 302, an audio signal during an identified time window is obtained from each microphone. The audio may be digitized by capturing the air vibrations of the sound and turning the vibrations into an electrical signal. The air vibrations may be sampled at equaled spaced moments in time during the time window. The sampled audio may be represented as time vectors.

In embodiments, each microphone detects changes in air pressure and transmits a corresponding voltage change based on the change in air pressure to an analog-to-digital converter where the voltage is periodically sampled according to an audio sampling rate. The sampled audio values may be a time-domain signal referred to as a time vector. At block 302, audio captured by each of microphone 1 and microphone 2 is converted into time vectors, with a first time vector that corresponds to microphone 1 and a second time vector that corresponds to microphone 2. Each time vector is normalized to eliminate the effect of each microphone having a slightly different gain. The normalized time vector from a first microphone is subtracted from a normalized time vector from the second microphone to obtain a difference in frequency content between the microphone pair for the time window. In embodiments, the subtraction is vector subtraction that is done element by element, for each element of the time vectors. A first RMS value of the resulting difference related to the delay between both microphone signals is calculated to obtain a first feature coefficient. The first feature coefficient is the RMS value of the direct difference in content between the first microphone and the second microphone.

In embodiments, the RMS value may be calculated as the square root of the arithmetic mean of the squares of the elements in the resulting difference in frequency content. In embodiments, the RMS value may also be calculated as the square of the function that defines the continuous waveform. The calculations performed when calculating the RMS value do not include transformations such as a Fast Fourier Transform, Laplace Transform, and the like. Thus, the use of the RMS transform results in a lower computational cost when determining a location of a sound source. Moreover, the present techniques result in a reduction in power consumed when determining a location of a sound source due to the limited number of microphones required in additional to a lower computation costs when compared to other microphone arrays that use FFT based cross correlation with deep learning algorithms. Moreover, the present techniques do not require the use of any additional hardware, such as an optical sensor, camera, or ultrasonic sensor. Indeed, optical devices usually cannot detect if a certain object is producing sound by itself. Besides, the image processing off all these optical devices always implies a very large amount of operations. Further, ultrasonic devices are limited to simple detection of solid surfaces that might or might not be producing sound. Ultrasonic devices do not allow to detect active sound sources in particular.

For ease of description, RMS values are used to derive a number of feature coefficients. However, any value that is proportional to the amplitude or energy of the signal may be used. For example, a mean absolute value (MAV) may be applied to the difference in frequency content to determine a feature coefficient. Moreover, the RMS values may be calculated in parallel.

At block 304, a second descriptor is calculated from audio captured during the time window for the microphone pair. At block 304, a delay is applied to the audio signal captured by the second microphone of the microphone pair. In embodiments, the samples captured by the second microphone may be delayed by a predetermined number of samples. At block 304 the second channel is delayed by a small and fixed amount of "D" samples (~2 for a sample frequency of 16 kHz) before performing the subtraction. The delay is not determined using cross-correlation. In embodiments, the delay is selected such that the number of samples represented by the delay is a small portion of the total number of samples in a single wavelength of the audio captured within the time window. The number of samples in the delay may be 2-5 samples.

Each time vector is normalized to eliminate the effect of each microphone having a slightly different gain. Thus, the time vector as sampled from audio captured by the first microphone is normalized, and the time vector as sampled from the audio captured by the second microphone and delayed is normalized.

The normalized time vector from the first microphone may be subtracted from a normalized delayed time vector from the second microphone to obtain a difference in frequency content for the time window. In embodiments, the subtraction is vector subtraction that is done element by element, for each element of the time vectors. A second RMS value of the resulting difference related to the delay between both microphone signals is calculated to obtain a second feature coefficient. The second feature coefficient is the RMS value of a delayed difference in content between the first microphone and the second microphone.

At block 306, the audio signal during the identified time window is obtained from each microphone. At block 306, an acoustic barrier filter is applied to audio captured by each of microphone 1 and microphone 2. In embodiments, the filter may be a bandpass filter coinciding with the acoustic barrier filter. This ensures that this signal will have a very different profile is it located behind the barrier, than if it is in front of it. In particular, the digital filter may emulate the frequency response of the physical acoustic barrier present on the device. The signal from both vectors is normalized and the signals are subtracted element by element. Then, the RMS value of the resulting subtraction is calculated.

The present techniques enable a measure of variability, such as the RMS value, that distinguishes a difference between captured microphone signals based on the location of the sound source. For example, if the sound source is located generally in front of the microphone array, without an acoustic barrier substantially impeding the path from the sound source to the microphone array, a comparison of the digitally filtered and unfiltered audio signals reveals very different audio signals. In the event that the sound source is located generally in behind of the microphone array, with an acoustic barrier impeding the path from the sound source to the microphone array, a comparison of the digitally filtered and unfiltered audio signals reveals similar audio signals. In embodiments, the higher the affect of the physical acoustic barrier on an audio signal, the higher the likelihood that the audio source is located at a position where the audio signal is significantly impeded by the acoustic barrier. In this scenario, the filtered and unfiltered audio signals are similar in content. However, if the audio signal originates from a sound source substantially in front of the physical acoustic barrier, the filtered and unfiltered audio signals are different in content, as the unfiltered signal will typically contain a larger range of frequency content when compared to the digitally filtered signals. Thus, in embodiments a high pass filter with a same cutoff frequency as the acoustic barrier may be implemented to emphasize the difference between audio signals from the front of the physical acoustic barrier and the back of the physical acoustic barrier.

Accordingly, at block 306, the filtered audio signals are converted into time vectors, with a first time vector that corresponds to microphone 1 and a second time vector that corresponds to microphone 2. Each time vector resulting from the filtered audio is normalized to eliminate the effect of each microphone having a slightly different gain. The normalized time vector from a first microphone is subtracted from a normalized time vector from the second microphone to obtain a difference in frequency content between the microphone pair for the time window. In embodiments, the subtraction is vector subtraction that is done element by element, for each element of the time vectors. A third RMS value of the difference related to the delay between both microphone signals is calculated to obtain a third feature coefficient. The third feature coefficient is the RMS value of the filtered difference in content between the first microphone and the second microphone.

At block 308, a fourth feature coefficient is calculated from filtered audio captured during the time window for the microphone pair. At block 308, a delay is applied to the filtered audio signal captured by the second microphone of the microphone pair. In embodiments, the samples captured by the second microphone may be delayed by a predetermined number of samples. At block 308, the second channel is delayed by a small and fixed amount of "D" samples (~2 for a sample frequency of 16 kHz) before performing the subtraction. Each time vector is normalized to eliminate the effect of each microphone having a slightly different gain. Thus, the time vector as sampled from audio captured by the first microphone is normalized, and the time vector as sampled from the audio captured by the second microphone and delayed is normalized. A fourth RMS value of the resulting difference related to the delay between both microphone signals is calculated to obtain a fourth feature coefficient. The fourth feature coefficient is the RMS value of a filtered and delayed difference in content between the first microphone and the second microphone.

At block 310, all feature coefficients are concatenated into a final feature vector that corresponds to the analyzed time window. In particular, the first, second, third, and fourth feature coefficients are concatenated to form a feature vector that represents the time window. This full feature vector includes the RMS values of the direct, delayed, filtered, and filtered and delayed channel difference found at blocks 302, 304, 306, and 308. In embodiments, the feature vector is input to a trained neural network. The neural network may be trained to determine a location of an audio source that output the audio captured during the time window.

The diagram of FIG. 3 is not intended to indicate that the example feature extraction 300 is to include all of the components shown in FIG. 3. Rather, the example example feature extraction 300 can be implemented using fewer or additional components not illustrated in FIG. 3 (e.g., additional measures of variability, neural networks, filters, etc.).

Figure 4:
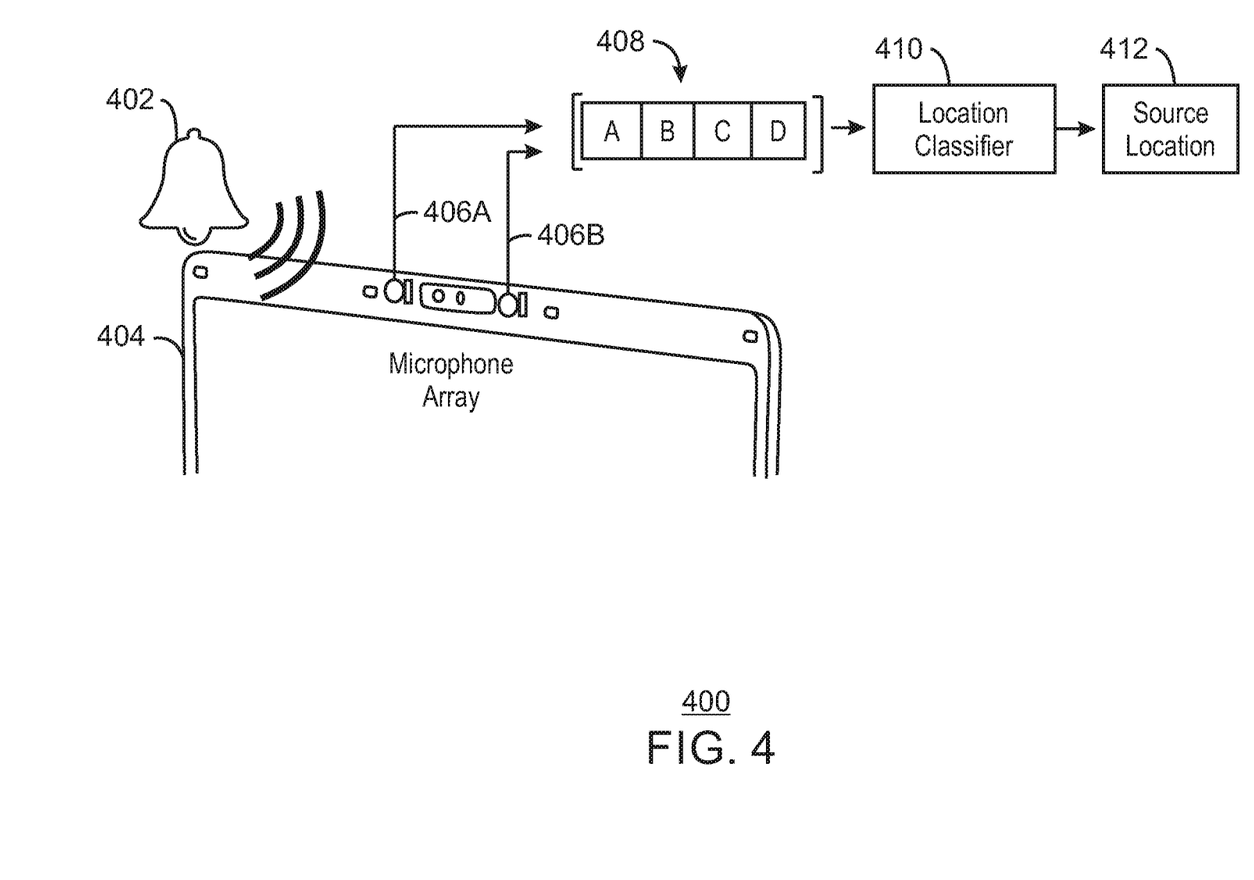
FIG. 4 is an illustration of location classification.

FIG. 4 is an illustration of location classification 400. In FIG. 4, a scheme of the full source location detection pipeline is illustrated. FIG. 4 includes a sound source 402. A laptop 404 includes a microphone array 406 with two microphone sensors. In particular, the microphone array 406 includes a first microphone 406A and a second microphone 406B. The microphone 406A and 406B may capture audio signals as emitted from the sound source 402. Moreover, the lid of the laptop 406 serves as an acoustic barrier to the sound emitted via audio signals from the sound source 402.

The audio signals from the sound source 402 may be processed as described with respect to FIG. 3 to obtain a feature vector 408. The feature vector 408 may be input to a location classifier 410. The classifier may be, for example, a supervised machine learning classifier that outputs a source location 412. The source location may be an angle that identifies the location of the sound source relative to the microphone array. For example, the location classifier may output an angle of arrival associated with the sound or an azimuth. The classifier may be a feed forward network with two layers. The location classifier 420 may be built with a shallow neural net and produces a location from input features. The location classifier may also be able to estimate location in general, such as distance or elevation.

Figure 5:
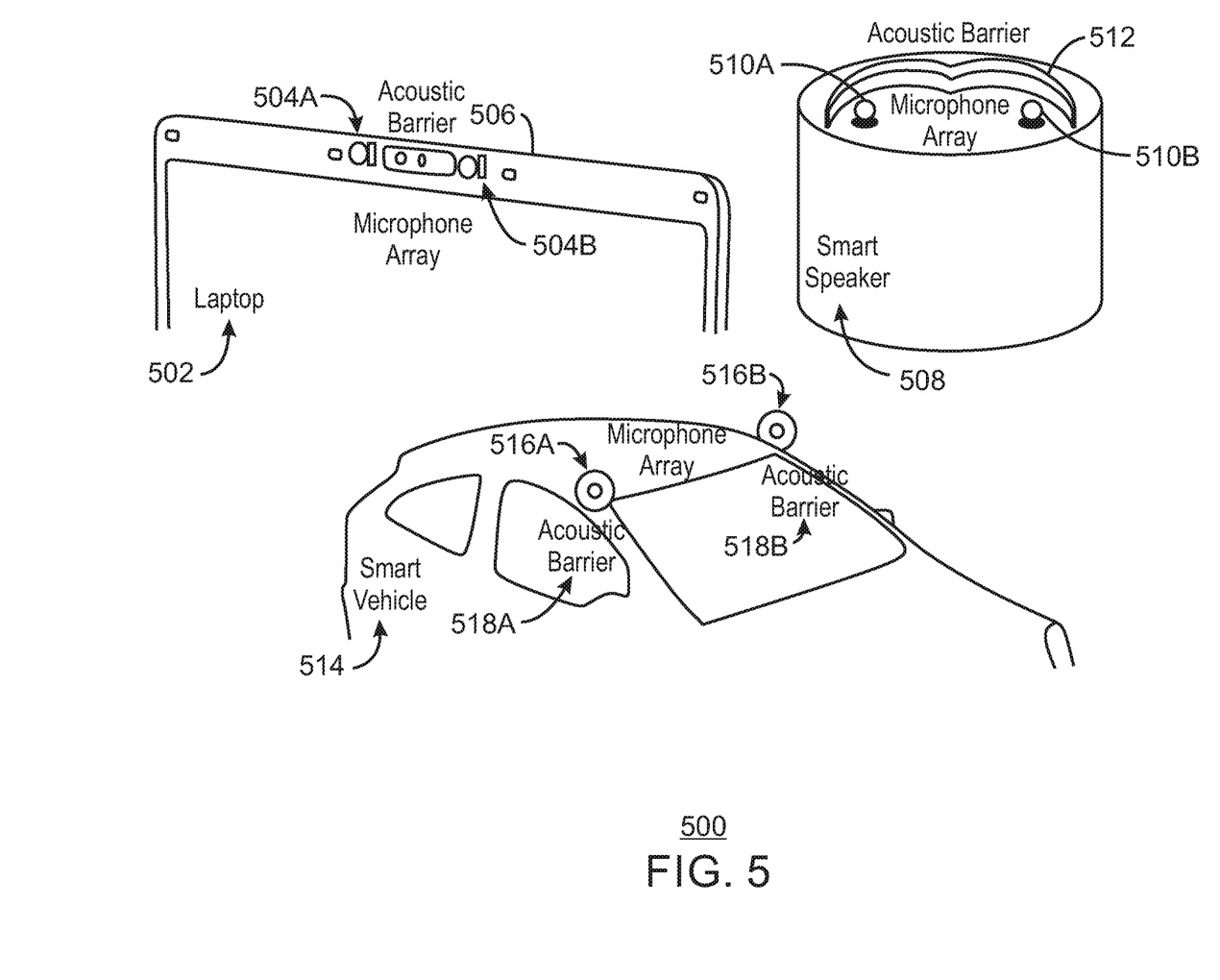
FIG. 5 is an illustration of exemplary form factors.

FIG. 5 is an illustration of exemplary form factors. In particular, FIG. 5 illustrates examples of acoustic barriers that are implemented in two-microphone arrays in a laptop 502, a smart speaker 508, and a smart vehicle 514. The laptop 502 may include a microphone array 504. The microphone array 504 includes microphones 504 a and 504B. As illustrated, and acoustic barrier is formed by the lid 506 of the laptop 502. In this manner, sound encountered by the microphone 504A and 504B experience filtering due to the acoustic barrier 506. The particular filtering enabled by the acoustic barrier 506 may be used to digitally filter the receive signals to derive a full-length feature vector. The particular frequency response of the digital filtering may be the same as the actual physical filtering provided by the acoustic barrier 506.

Smart speaker 508 may include a microphone array 510. The microphone array 510 includes microphones 510A and 51B. Near the microphone array 510, and acoustic barrier is formed. As illustrated, the acoustic barrier defines a semicircular area where the microphone 510A and the microphone 510B are located within the semicircular area. In this manner, sound encountered by the microphone 510A and the microphone 510B may experience filtering due to the acoustic barrier 512. As described above, the particular filtering enabled by the acoustic barrier 512 may be used to filter the received signals to derive a full length feature vector. The particular frequency response of the digital filtering may be the same as the actual physical filtering provided by the acoustic barrier 512.

Similarly, the vehicle 514 may include a microphone array 516. The microphone array 516 includes microphones 516A and 516B. Near the microphone array 516 and acoustic barrier 518 is formed. In the example of the smart vehicle 514, the acoustic barrier is formed by the physical housing for frame of the smart vehicle 514. For example, the frame 518A of the vehicle 514 may form a portion of the acoustic barrier. Additionally, the glass 518B positioned throughout the frame of the vehicle 514 may also form a portion of the acoustic barrier 518. The particular filtering enabled by the acoustic barrier 518 may be used to filter the signals received by the microphone 516A and 516B and used to derive a full-length feature vector. The particular frequency response of the digital filtering may be the same as the actual physical filtering provided by the acoustic barrier 518. While particular form factors have been described, the present techniques may be used across any form factor with an acoustic barrier and two microphones. Thus, this concept can be implemented into different form factors, or systems, like regular laptops, smart speakers or other home/office devices, and vehicles.

Figure 6:
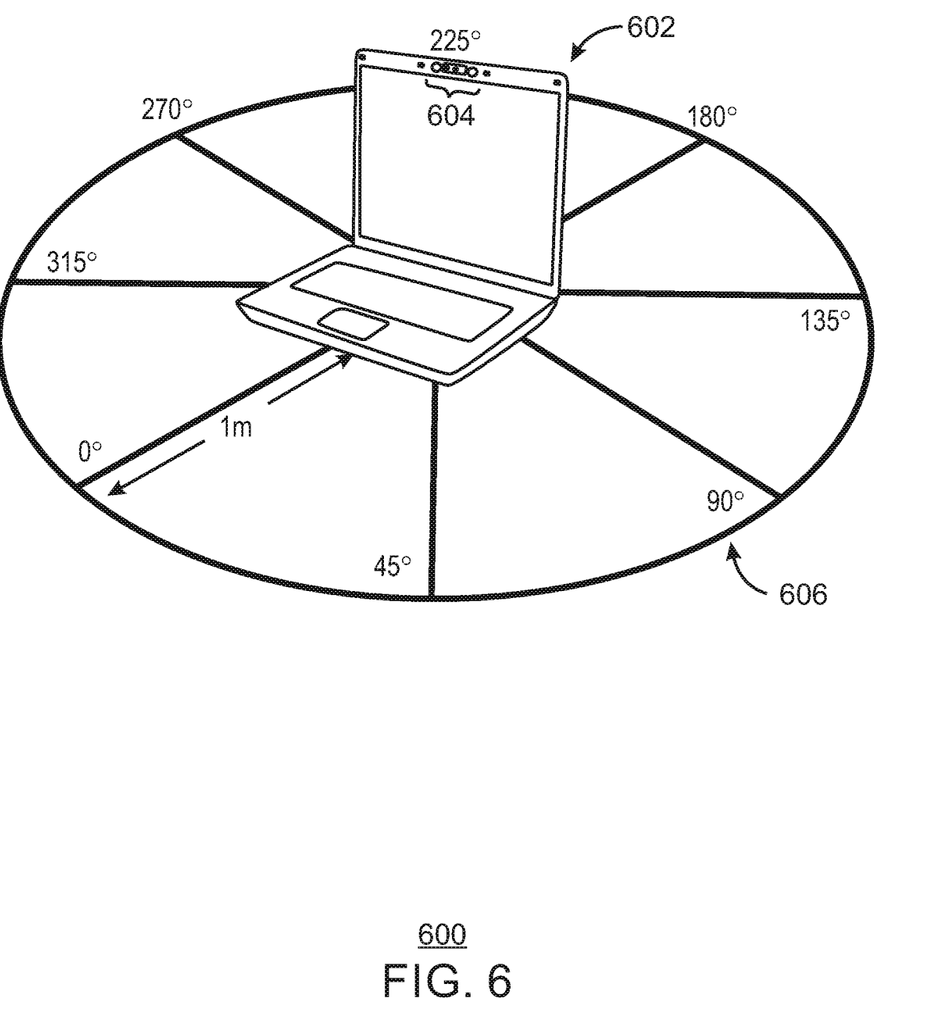
FIG. 6 is an illustration of an exemplary environment where an audio source may be located.

FIG. 6 is an illustration of an exemplary environment 600 where an audio source may be located. The laptop 602 may include a microphone array 604. The spherical coordinate system 606 is illustrated at one meter from the laptop 602, which is located at the origin of the spherical coordinate system 606. In embodiments, the location classifier outputs a sound location as an azimuth. The azimuth may be used to determine a vector from the origin to the location of the sound source. In this manner, the location of the sound source may be identified.

Consider an exemplary use case with a total of 1500 audio segments, each one second in duration with a 44100 Hz of sample frequency. The audio segments may be recorded at eight different angles (0°, 45°, 90°, 135°, 180°, 225°, 270°, and 315°) at a distance of one meter around the open laptop 602. In the example of FIG. 6, the acoustic barrier filter may be selected from 4000 Hz to 8000 Hz.

In the present example, a randomly selected 80% of the segments were used for training and the rest (20%, 300 samples) were used for validation. Features from the audio samples were obtained using the proposed routine described in FIG. 3, with a fixed delay D of 3 samples. A shallow fully connected neural network of 2 inputs, 2 hidden layers, and 6 neurons at the output (22 neurons in total), and with sigmoid activation function, was trained and tested with the generated features described in FIG. 3, and the classification results were measured and compared with the real labels of the validation samples.

The results from the present techniques as applied to the example of FIG. 6 are illustrated below. As can be noticed, from all 300 validation samples, the neural network only misidentified 2 angles, which amounts for 99.7% of correct angle of arrival classification rate.

TABLE 1

| | Measured Angle | | | | | | | |
|---|---|---|---|---|---|---|---|---|
| Real Angle | 0° | 45° | 90° | 135° | 180° | 235° | 270° | 315° |
| 0° | 42 | 0 | 0 | 0 | 0 | 0 | 2 | 0 |
| 45° | 0 | 33 | 0 | 0 | 0 | 0 | 0 | 0 |
| 90° | 0 | 0 | 31 | 0 | 0 | 0 | 0 | 0 |
| 135° | 0 | 0 | 0 | 40 | 0 | 0 | 0 | 0 |
| 180° | 0 | 0 | 0 | 0 | 47 | 0 | 0 | 0 |
| 235° | 0 | 0 | 0 | 0 | 0 | 38 | 0 | 0 |
| 270° | 0 | 0 | 0 | 0 | 0 | 0 | 34 | 0 |
| 315° | 0 | 0 | 0 | 0 | 0 | 0 | 0 | 33 |

The results in Table 1 demonstrate the feasibility of implementing a two microphone-array with an added human-inspired acoustic barrier to detect a full 360° angle of arrival detection. The present methodology is based on only two microphones and a very lightweight neural network technology for the location of a sound source, which eliminates the need of a digital signal processor (DSP) for processing incoming signals for this task. In a very simple implementation, it successfully detects audio all around 360° the array (which cannot be done using regular techniques with such a small array), with a performance of 99.3% correct classification.

Figure 7:
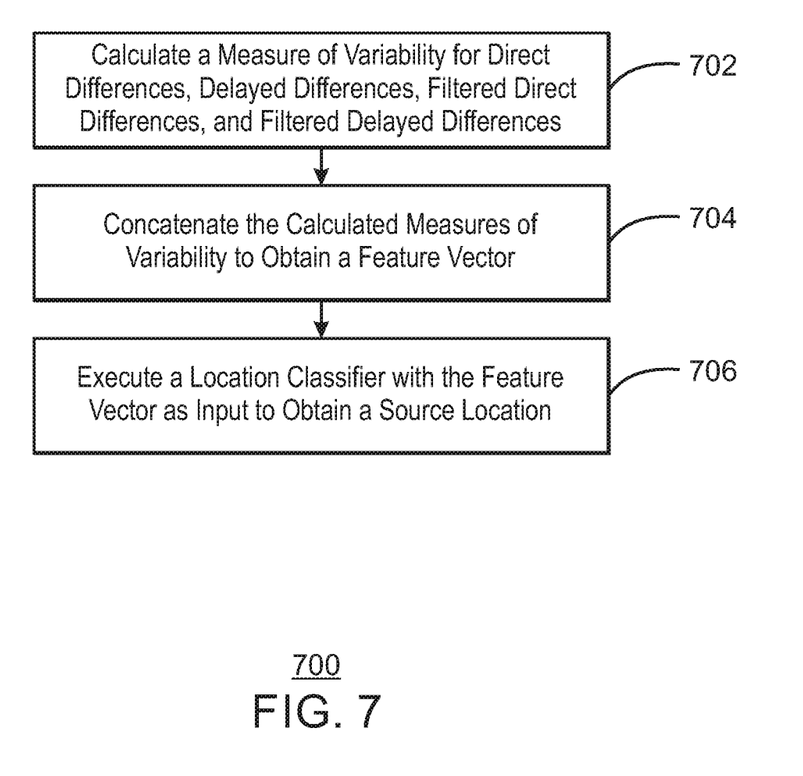
FIG. 7 is a process flow diagram of a method.

FIG. 7 is a process flow diagram of a method 700. The example method 700 and be implemented in the feature extraction 300 of FIG. 3, the computing device 800 of FIG. 8, or the computer readable media 900 of FIG. 9. In some examples, the method 300 can be implemented using the location classifier 400 of FIG. 4. At block 702, a measure of variability is calculated for direct differences, delayed differences, filtered direct differences, and filtered delayed differences. At block 704, the calculated measures of variability are concatenated to obtain a feature vector. At block 706, the feature vector is input into a location classifier to obtain a source location.

This process flow diagram is not intended to indicate that the blocks of the example method 700 are to be executed in any particular order, or that all of the blocks are to be included in every case. Further, any number of additional blocks not shown may be included within the example method 700, depending on the details of the specific implementation. For example, the audio signal may be captured by the microphone pair and normalized prior to calculating the measure of variability.

Figure 8:
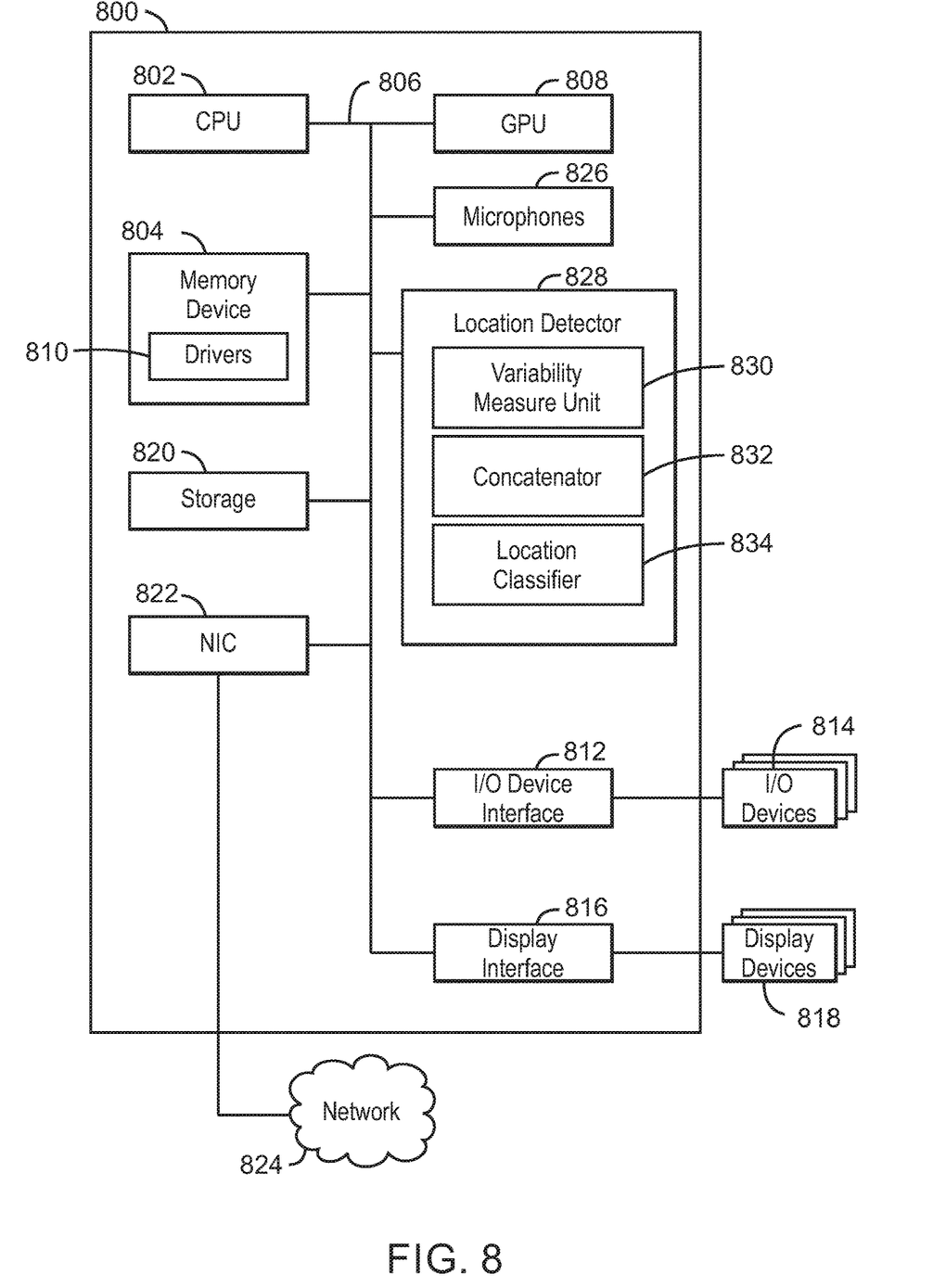
FIG. 8 is a block diagram of an electronic device that enables a lightweight full three-hundred- and sixty-degree audio sound location with two microphones.

FIG. 8 is a block diagram of an electronic device that enables a lightweight full three-hundred- and sixty-degree audio sound location with two microphones. The location of an audio source may be determined in real-time. The electronic device 800 may be, for example, a laptop computer, tablet computer, mobile phone, smart phone, a wearable headset, a smart headset, a smart glass or speaker system, or vehicle, among others. The electronic device 800 may include a central processing unit (CPU) 802 that is configured to execute stored instructions, as well as a memory device 804 that stores instructions that are executable by the CPU 802. The CPU may be coupled to the memory device 804 by a bus 806. Additionally, the CPU 802 can be a single core processor, a multi-core processor, a computing cluster, or any number of other configurations. Furthermore, the electronic device 800 may include more than one CPU 802. The memory device 804 can include random access memory (RAM), read only memory (ROM), flash memory, or any other suitable memory systems. For example, the memory device 804 may include dynamic random-access memory (DRAM).

The computing device 800 may also include a graphics processing unit (GPU) 808. As shown, the CPU 802 may be coupled through the bus 806 to the GPU 808. The GPU 808 may be configured to perform any number of graphics operations within the computing device 800. For example, the GPU 808 may be configured to render or manipulate graphics images, graphics frames, videos, or the like, to be displayed to a user of the computing device 800.

The memory device 804 can include random access memory (RAM), read only memory (ROM), flash memory, or any other suitable memory systems. For example, the memory device 804 may include dynamic random-access memory (DRAM). The memory device 804 may include device drivers 810 that are configured to execute the instructions for training multiple convolutional neural networks to perform sequence independent processing. The device drivers 810 may be software, an application program, application code, or the like.

The CPU 802 may also be connected through the bus 806 to an input/output (I/O) device interface 812 configured to connect the computing device 800 to one or more I/O devices 814. The I/O devices 814 may include, for example, a keyboard and a pointing device, wherein the pointing device may include a touchpad or a touchscreen, among others. The I/O devices 814 may be built-in components of the computing device 800, or may be devices that are externally connected to the computing device 800. In some examples, the memory 804 may be communicatively coupled to I/O devices 814 through direct memory access (DMA).

The CPU 802 may also be linked through the bus 806 to a display interface 816 configured to connect the computing device 800 to a display device 818. The display device 818 may include a display screen that is a built-in component of the computing device 800. The display device 818 may also include a computer monitor, television, or projector, among others, that is internal to or externally connected to the computing device 800.

The computing device 800 also includes a storage device 820. The storage device 820 is a physical memory such as a hard drive, an optical drive, a thumb drive, an array of drives, a solid-state drive, or any combinations thereof. The storage device 820 may also include remote storage drives.

The computing device 800 may also include a network interface controller (NIC) 822. The NIC 822 may be configured to connect the computing device 800 through the bus 806 to a network 824. The network 824 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The electronic device 800 can also include a microphone array 826. The microphone array 826 includes two independent microphones. In embodiments, each microphone may be a Micro Electrical-Mechanical System (MEMS) microphone. Audio from a sound source may be captured via the microphone array 826. The location detector 828 may obtain the electrical signal captured by the microphones and determine a location of the sound source. In particular, a variability measure unit 830 may be used to calculate feature coefficients associated with the microphone pair. In particular, the variability measure may be any value that is proportional to the amplitude or energy of the signal may be used. For example, an RMS value or a mean absolute value (MAV) may be applied to the difference in frequency content to determine a feature coefficient. A concatenator 832 may concatenate multiple feature coefficients into a feature vector. A location classifier 834 may take as input the feature vector and determine a location.

The block diagram of FIG. 8 is not intended to indicate that the computing device 800 is to include all of the components shown in FIG. 8. Rather, the computing system 800 can include fewer or additional components not illustrated in FIG. 8 (e.g., sensors, power management integrated circuits, additional network interfaces, etc.). The computing device 800 may include any number of additional components not shown in FIG. 8, depending on the details of the specific implementation. Furthermore, any of the functionalities of the CPU 802 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 9:
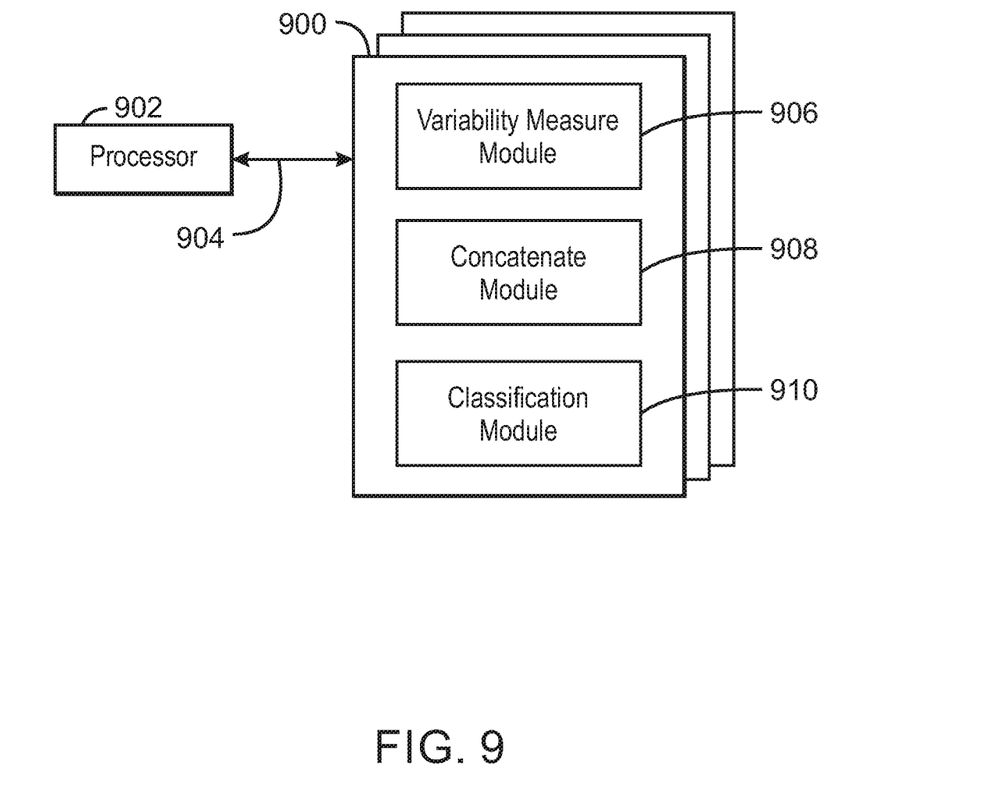
FIG. 9 is a block diagram showing a medium that contains enables a lightweight full three-hundred- and sixty-degree audio sound location with two microphones.

FIG. 9 is a block diagram showing a medium 900 that contains enables a lightweight full three-hundred- and sixty-degree audio sound location with two microphones. The medium 900 may be a computer-readable medium, including a non-transitory medium that stores code that can be accessed by a processor 902 over a computer bus 904. For example, the computer-readable medium 900 can be volatile or non-volatile data storage device. The medium 900 can also be a logic unit, such as an Application Specific Integrated Circuit (ASIC), a Field Programmable Gate Array (FPGA), or an arrangement of logic gates implemented in one or more integrated circuits, for example.

The medium 900 may include modules 906-910 configured to perform the techniques described herein. For example, a variability measure module 906 may be configured to calculate feature coefficients associated with the microphone pair. In particular, the variability measure may be any value that is proportional to the amplitude or energy of the signal may be used. For example, an RMS value or a mean absolute value (MAV) may be applied to the difference in frequency content to determine a feature coefficient. A concatenate module 908 is configured to concatenate multiple feature coefficients into a feature vector. A classification module 910 may be configured to take as input the feature vector and determine a location. In some embodiments, the modules 906-910 may be modules of computer code configured to direct the operations of the processor 902.

The block diagram of FIG. 9 is not intended to indicate that the medium 900 is to include all of the components shown in FIG. 9. Further, the medium 900 may include any number of additional components not shown in FIG. 9, depending on the details of the specific implementation.

Example 1 is a system. The system includes a physical acoustic barrier; a microphone array comprising a first microphone and a second microphone; at least one hardware processor that is configured to: identify a pre-determined acoustic barrier filter, wherein the acoustic barrier filter coincides with the physical acoustic barrier; receive an audio signal within a time window at the first microphone and the second microphone; calculate a first measure of variability of a direct difference of the audio signal received at the first microphone and the second microphone; calculate a second measure of variability of a delayed difference of the audio signal received at the first microphone and the second microphone; calculate a third measure of variability of a filtered direct difference of the audio signal received at the first microphone and the second microphone, wherein the audio signal is filtered by the pre-determined acoustic barrier filter; calculate a fourth measure of variability of a filtered delayed difference of the audio signal received at the first microphone and the second microphone, wherein the audio signal is filtered by the pre-determined acoustic barrier filter; concatenate the first measure of variability, the second measure of variability, the third measure of variability, and the fourth measure of variability to form a feature vector; and input the feature vector into a location classifier to obtain an audio source location.

Example 2 includes the system of example 1, including or excluding optional features. In this example, the predetermined acoustic barrier filter coincides with the physical acoustic barrier filter by replicating a frequency response of the physical acoustic barrier filter.

Example 3 includes the system of any one of examples 1 to 2, including or excluding optional features. In this example, the location classifier is a shallow neural network.

Example 4 includes the system of any one of examples 1 to 3, including or excluding optional features. In this example, the first, second, third and fourth measure of variability is a root mean square value.

Example 5 includes the system of any one of examples 1 to 4, including or excluding optional features. In this example, the first, second, third and fourth measure of variability is a root mean square value.

Example 6 includes the system of any one of examples 1 to 5, including or excluding optional features. In this example, the predetermined acoustic barrier filter is a bandpass filter that coincides with the physical acoustic barrier filter.

Example 7 includes the system of any one of examples 1 to 6, including or excluding optional features. In this example, the physical acoustic barrier is a surface that alters a frequency component of the audio signal from an audio source.

Example 8 includes the system of any one of examples 1 to 7, including or excluding optional features. In this example, a difference is calculated by normalizing the audio signal received by the first microphone and the second microphone, and subtracting a normalized audio signal captured by the first microphone from a normalized audio signal captured by the second microphone.

Example 9 includes the system of any one of examples 1 to 8, including or excluding optional features. In this example, a delayed audio signal is generated by delaying the audio signal at the second microphone by a pre-determined number of samples.

Example 10 includes the system of any one of examples 1 to 9, including or excluding optional features. In this example, the audio source location is an angle of arrival.

Example 11 is a method. The method includes identifying a pre-determined acoustic barrier filter, wherein the acoustic barrier filter coincides with a physical acoustic barrier; receiving an audio signal within a time window at a first microphone and a second microphone; calculating a first measure of variability of a direct difference of the audio signal received at the first microphone and the second microphone, a second measure of variability of a delayed difference of the audio signal received at the first microphone and the second microphone, a third measure of variability of a filtered direct difference of the audio signal received at the first microphone and the second microphone, wherein the audio signal is filtered by the pre-determined acoustic barrier filter, and a fourth measure of variability of a filtered delayed difference of the audio signal received at the first microphone and the second microphone, wherein the audio signal is filtered by the pre-determined acoustic barrier filter; concatenating the first measure of variability, the second measure of variability, the third measure of variability, and the fourth measure of variability to form a feature vector; and inputting the feature vector into a location classifier to obtain an audio source location.

Example 12 includes the method of example 11, including or excluding optional features. In this example, the predetermined acoustic barrier filter coincides with the physical acoustic barrier filter by replicating a frequency response of the physical acoustic barrier filter.

Example 13 includes the method of any one of examples 11 to 12, including or excluding optional features. In this example, the location classifier is a shallow neural network.

Example 14 includes the method of any one of examples 11 to 13, including or excluding optional features. In this example, the first, second, third and fourth measure of variability is a root mean square value.

Example 15 includes the method of any one of examples 11 to 14, including or excluding optional features. In this example, the first, second, third and fourth measure of variability is a root mean square value.

Example 16 includes the method of any one of examples 11 to 15, including or excluding optional features. In this example, the predetermined acoustic barrier filter is a bandpass filter that coincides with the physical acoustic barrier filter.

Example 17 includes the method of any one of examples 11 to 16, including or excluding optional features. In this example, the physical acoustic barrier is a surface that alters a frequency component of the audio signal from an audio source.

Example 18 includes the method of any one of examples 11 to 17, including or excluding optional features. In this example, a difference is calculated by normalizing the audio signal received by the first microphone and the second microphone, and subtracting a normalized audio signal captured by the first microphone from a normalized audio signal captured by the second microphone.

Example 19 includes the method of any one of examples 11 to 18, including or excluding optional features. In this example, a delayed audio signal is generated by delaying the audio signal at the second microphone by a pre-determined number of samples.

Example 20 includes the method of any one of examples 11 to 19, including or excluding optional features. In this example, the audio source location is an angle of arrival.

Example 21 is at least one computer readable medium for concealing phrases in audio having instructions stored therein that. The computer-readable medium includes instructions that direct the processor to identify a pre-determined acoustic barrier filter, wherein the acoustic barrier filter coincides with a physical acoustic barrier; receive an audio signal within a time window at a first microphone and a second microphone; calculate a first measure of variability of a direct difference of the audio signal received at the first microphone and the second microphone, a second measure of variability of a delayed difference of the audio signal received at the first microphone and the second microphone, a third measure of variability of a filtered direct difference of the audio signal received at the first microphone and the second microphone, wherein the audio signal is filtered by the pre-determined acoustic barrier filter, and a fourth measure of variability of a filtered delayed difference of the audio signal received at the first microphone and the second microphone, wherein the audio signal is filtered by the pre-determined acoustic barrier filter; concatenate the first measure of variability, the second measure of variability, the third measure of variability, and the fourth measure of variability to form a feature vector; and input the feature vector into a location classifier to obtain an audio source location.

Example 22 includes the computer-readable medium of example 21, including or excluding optional features. In this example, the predetermined acoustic barrier filter coincides with the physical acoustic barrier filter by replicating a frequency response of the physical acoustic barrier filter.

Example 23 includes the computer-readable medium of any one of examples 21 to 22, including or excluding optional features. In this example, the location classifier is a shallow neural network.

Example 24 includes the computer-readable medium of any one of examples 21 to 23, including or excluding optional features. In this example, the first, second, third and fourth measure of variability is a root mean square value.

Example 25 includes the computer-readable medium of any one of examples 21 to 24, including or excluding optional features. In this example, the first, second, third and fourth measure of variability is a root mean square value.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising:
a physical acoustic barrier;
a microphone array, the microphone array including a first microphone and a second microphone;
at least one hardware processor that is configured to:
identify a pre-determined acoustic barrier filter, wherein the pre-determined acoustic barrier filter coincides with the physical acoustic barrier;

receive an audio signal within a time window at the first microphone and the second microphone;

calculate a first measure of variability of a direct difference of the audio signal received at the first microphone and the second microphone;

calculate a second measure of variability of a delayed difference of the audio signal received at the first microphone and the second microphone;

calculate a third measure of variability of a filtered direct difference of the audio signal received at the first microphone and the second microphone, wherein the audio signal is filtered by the pre-determined acoustic barrier filter;

calculate a fourth measure of variability of a filtered delayed difference of the audio signal received at the first microphone and the second microphone, wherein the audio signal is filtered by the pre-determined acoustic barrier filter;

concatenate the first measure of variability, the second measure of variability, the third measure of variability, and the fourth measure of variability to form a feature vector; and input the feature vector into a location classifier to obtain an audio source location.

2. The system of claim 1, wherein the pre-determined acoustic barrier filter coincides with the physical acoustic barrier filter by replicating a frequency response of the physical acoustic barrier.

3. The system of claim 1, wherein the location classifier is a shallow neural network.

4. The system of claim 1, wherein the first, second, third and fourth measures of variability are root mean square values.

5. The system of claim 1, wherein the pre-determined acoustic barrier filter is a bandpass filter that coincides with the physical acoustic barrier.

6. The system of claim 1, wherein the physical acoustic barrier is a surface that alters a frequency component of the audio signal from an audio source.

7. The system of claim 1, wherein a difference is calculated by normalizing the audio signal received by the first microphone and the second microphone, and subtracting a first normalized audio signal captured by the first microphone from a second normalized audio signal captured by the second microphone.

8. The system of claim 1, wherein a delayed audio signal is generated by delaying the audio signal at the second microphone by a pre-determined number of samples.

9. The system of claim 1, wherein the audio source location is an angle of arrival.

10. The system of claim 1, wherein the first microphone and the second microphone are located in a vehicle.

11. A method, comprising:
identifying a pre-determined acoustic barrier filter, wherein the pre-determined acoustic barrier filter coincides with a physical acoustic barrier;

receiving an audio signal within a time window at a first microphone and a second microphone;

calculating a first measure of variability of a direct difference of the audio signal received at the first microphone and the second microphone, a second measure of variability of a delayed difference of the audio signal received at the first microphone and the second microphone, a third measure of variability of a filtered direct difference of the audio signal received at the first microphone and the second microphone, wherein the audio signal is filtered by the pre-determined acoustic barrier filter, and a fourth measure of variability of a filtered delayed difference of the audio signal received at the first microphone and the second microphone, wherein the audio signal is filtered by the pre-determined acoustic barrier filter;

concatenating the first measure of variability, the second measure of variability, the third measure of variability, and the fourth measure of variability to form a feature vector; and inputting the feature vector into a location classifier to obtain an audio source location.

12. The method of claim 11, wherein the pre-determined acoustic barrier filter coincides with the physical acoustic barrier by replicating a frequency response of the physical acoustic barrier.

13. The method of claim 11, wherein the location classifier is a shallow neural network.

14. The method of claim 11, wherein the first, second, third and fourth measures of variability are root mean square values.

15. The method of claim 11, wherein the pre-determined acoustic barrier filter is a bandpass filter that coincides with the physical acoustic barrier.

16. The method of claim 11, wherein the physical acoustic barrier is a surface that alters a frequency component of the audio signal from an audio source.

17. The method of claim 11, wherein a difference is calculated by normalizing the audio signal received by the first microphone and the second microphone, and subtracting a first normalized audio signal captured by the first microphone from a second normalized audio signal captured by the second microphone.

18. The method of claim 11, wherein a delayed audio signal is generated by delaying the audio signal at the second microphone by a pre-determined number of samples.

19. The method of claim 11, wherein the audio source location is an angle of arrival.

20. The method of claim 11, wherein the physical acoustic barrier is at least one of a housing in a vehicle, a frame of the vehicle, or glass of the vehicle, the identifying of the pre-determined acoustic barrier filter based on the at least one of the housing in the vehicle, the frame of the vehicle, or the glass of the vehicle.

21. At least one storage device or storage disk comprising instructions to cause a computing device to at least:
identify a pre-determined acoustic barrier filter, wherein the pre-determined acoustic barrier filter coincides with a physical acoustic barrier;

receive an audio signal within a time window at a first microphone and a second microphone;

calculate a first measure of variability of a direct difference of the audio signal received at the first microphone and the second microphone, a second measure of variability of a delayed difference of the audio signal received at the first microphone and the second microphone, a third measure of variability of a filtered direct difference of the audio signal received at the first microphone and the second microphone, wherein the audio signal is filtered by the pre-determined acoustic barrier filter, and a fourth measure of variability of a filtered delayed difference of the audio signal received at the first microphone and the second microphone, wherein the audio signal is filtered by the pre-determined acoustic barrier filter;

concatenate the first measure of variability, the second measure of variability, the third measure of variability, and the fourth measure of variability to form a feature vector; and input the feature vector into a location classifier to obtain an audio source location.

22. The at least one storage device or storage disk of claim 21, wherein the pre-determined acoustic barrier filter coincides with the physical acoustic barrier by replicating a frequency response of the physical acoustic barrier.

23. The at least one storage device or storage disk of claim 21, wherein the location classifier is a shallow neural network.

24. The at least one storage device or storage disk of claim 21, wherein the first, second, third and fourth measures of variability are root mean square values.

25. The at least one storage device or storage disk of claim 21, wherein the instructions are to cause the computing device to calculate the first measure of variability, the second measure of variability, the third measure of variability, and the fourth measure of variability in parallel.

\* \* \* \* \*